US012591301B2

(12) United States Patent
Shin

(10) Patent No.: US 12,591,301 B2
(45) Date of Patent: Mar. 31, 2026

(54) BILATERAL EXCHANGE OF USER ATTENTION STREAM FOR FOVEATED 3D COMMUNICATION STREAMING

(71) Applicant: GOOGLE LLC, Mountain View, CA (US)

(72) Inventor: Dongeek Shin, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/614,904

(22) Filed: Mar. 25, 2024

(65) Prior Publication Data

US 2025/0298465 A1     Sep. 25, 2025

(51) Int. Cl.
*G06F 3/01*          (2006.01)
*H04S 7/00*          (2006.01)
(52) U.S. Cl.
CPC .............. *G06F 3/013* (2013.01); *H04S 7/303* (2013.01); *H04S 7/40* (2013.01)
(58) Field of Classification Search
None
See application file for complete search history.

(56) References Cited

U.S. PATENT DOCUMENTS

| | | | | |
|---|---|---|---|---|
| 6,252,989 B1 * | 6/2001 | Geisler | .................. | H04N 19/64 |
| | | | | 375/E7.161 |
| 2018/0199039 A1 * | 7/2018 | Trepte | .................. | G06T 15/405 |
| 2018/0224935 A1 * | 8/2018 | Thunström | ............. | G06F 3/013 |

| | | | | |
|---|---|---|---|---|
| 2019/0028674 A1 * | 1/2019 | Smits | ..................... | H04N 7/157 |
| 2019/0035363 A1 * | 1/2019 | Schluessler | ............ | G09G 3/003 |
| 2019/0045317 A1 * | 2/2019 | Badhwar | ................. | H04S 7/302 |
| 2019/0156150 A1 * | 5/2019 | Krishnan | ............... | G06V 40/70 |
| 2020/0382894 A1 | 12/2020 | Walsh et al. | | |
| 2021/0203904 A1 | 7/2021 | Wetzstein et al. | | |

(Continued)

OTHER PUBLICATIONS

Ryoo, et al., Design and Evaluation of a Foveated Video Streaming Service for Commodity Client Devices, May 10, 2016, MMSys ' 16: Proceedings of the 7th International Conference on Multimedia Systems, Article No. 6, https://doi.org/10.1145/2910017.2910592, pp. 1-11 (Year: 2016).*

(Continued)

*Primary Examiner* — Kirk W Hermann
(74) *Attorney, Agent, or Firm* — Brake Hughes Bellermann LLP

(57)          ABSTRACT
A first three-dimensional (3D) communication device used by a first user may engage in a 3D communication session with a second 3D communication device used by a second user. For example, the first communication device may: transmit, to the second communication device, a first attention stream indicating where attention of the first user is directed; receive, from the second communication device, a second attention stream indicating where attention of the second user is directed; transmit, to the second communication device and based on the second attention stream, a first foveated image stream including a 3D representation of the first user; receive, from the second communication device, a second foveated image stream that is transmitted based on the first attention stream and includes a 3D representation of the second user; and present the second foveated image stream for viewing by the first user.

20 Claims, 10 Drawing Sheets

(56)     References Cited

U.S. PATENT DOCUMENTS

| | | | |
|---|---|---|---|
| 2022/0078396 A1* | 3/2022 | Gül | H04N 13/366 |
| 2022/0248088 A1* | 8/2022 | Ha | G06F 3/011 |
| 2023/0328470 A1* | 10/2023 | Lyren | H02M 1/08 |
| | | | 379/310 |
| 2023/0412724 A1* | 12/2023 | Ma | G02B 27/0103 |
| 2024/0040101 A1* | 2/2024 | Adam | H04N 19/54 |
| 2024/0305951 A1* | 9/2024 | Francl | G02B 27/0093 |
| 2025/0097395 A1* | 3/2025 | Ollila | H04N 13/156 |

OTHER PUBLICATIONS

Hsiao, et al., Towards retina-quality VR video streaming: 15ms could save you 80% of your bandwidth, Mar. 1, 2022, ACM SIGCOMM Computer Communication Review, vol. 52, Issue 1, https://doi.org/10.1145/3523230.3523233, pp. 10-19 (Year: 2022).*
Ryoo, et al., "Design and Evaluation of a Foveated Video Streaming Service for Commodity Client Devices", MMsys'16; http://dx.doi.org/10.1145/2910017.2910592, May 10-13, 2016, 11 pages.

* cited by examiner

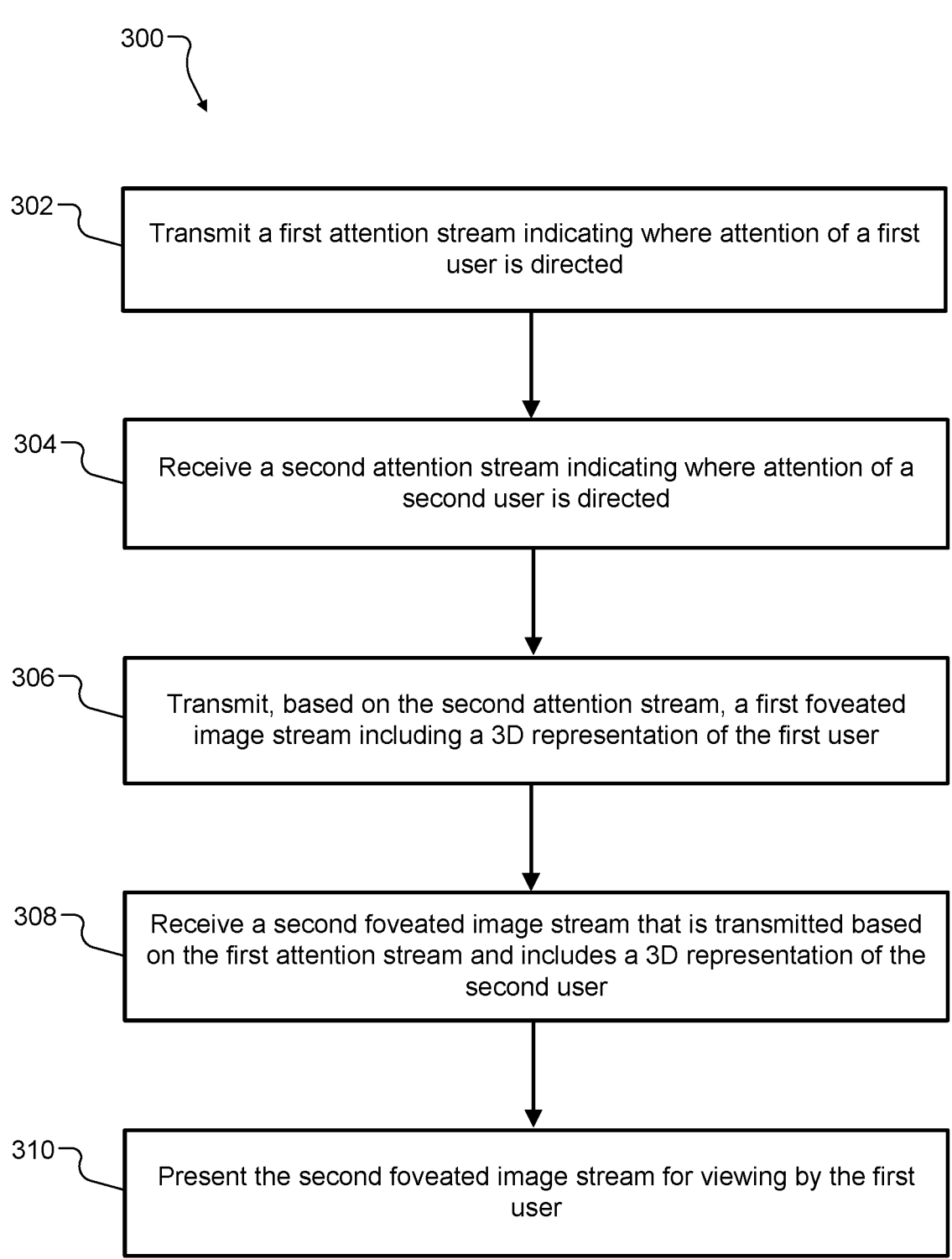

300

302   Transmit a first attention stream indicating where attention of a first user is directed 304   Receive a second attention stream indicating where attention of a second user is directed 306   Transmit, based on the second attention stream, a first foveated image stream including a 3D representation of the first user 308   Receive a second foveated image stream that is transmitted based on the first attention stream and includes a 3D representation of the second user 310   Present the second foveated image stream for viewing by the first user

FIG. 3

Attention Stream
502
(Independent)

Time [T_1] | Coord. [x_1, y_1]
Time [T_2] | Coord. [x_2, y_2]
Time [T_3] | Coord. [x_3, y_3]
Time [T_4] | Coord. [x_4, y_4]

. . .

Time [T_N] | Coord. [x_N, y_N]

Attention Stream
504
(Differential)

Time [T_1] | Coord. [x_1, y_1]
Time [T_2] | Change [delta_xy]
Time [T_3] | Change [delta_xy]
Time [T_4] | Change [delta_xy]

. . .

Time [T_N] | Change [delta_xy]

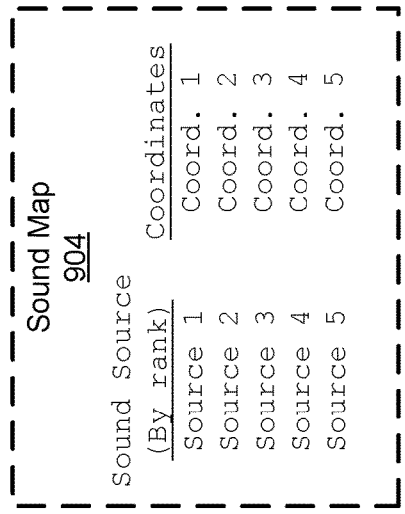
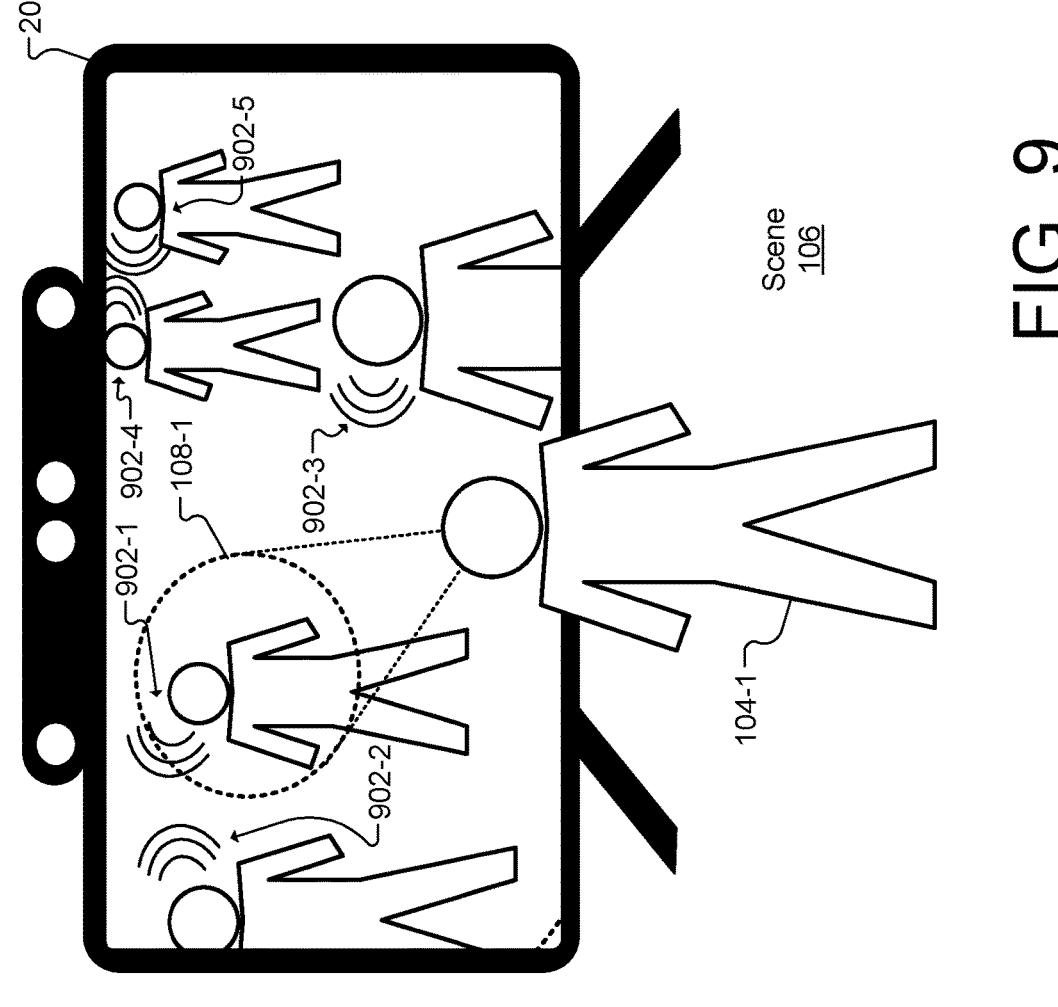
FIG. 9

BILATERAL EXCHANGE OF USER ATTENTION STREAM FOR FOVEATED 3D COMMUNICATION STREAMING

BACKGROUND

Remote communication technologies have long provided ways for people separated by distance to communicate with one another in real time. For example, the telephone provided a form of real-time audio communication between remotely-separated users for decades before other more sophisticated technologies (e.g., cellular technologies, voice-over-Internet-protocol (VoIP) technologies, etc.) were developed to let people communicate with more flexibility, lower cost, higher quality of service, and so forth. More recently, video communication technologies have become widely used to allow people to not only hear, but also see, one another in real-time over long distances.

SUMMARY

Implementations described herein facilitate three-dimensional (3D) communication by reducing the compute resources (e.g., data communication bandwidth, data processing, etc.) used to transmit otherwise enormous amounts of data that represent 3D representations of people communicating on each side of a 3D communication link. In particular, implementations described herein perform a bilateral exchange of user attention streams (i.e., data streams that indicate where attention of each user of the 3D communication link is focused), and then use those attention streams to generate and transmit (on one side of the link), and receive and present (on the other side of the link), a 3D representation that may be considerably more sparse than the original representation while still providing ample detail in accordance with the attention of the user consuming the representation. For example, a 3D representation of a first user of a 3D communication link may be transmitted as a 3D communication stream that is reduced based on an attention stream of a second user. In this way, the reduced 3D communication stream may provide plenty of detail for parts of the representation that the second user is paying attention to (and will be able to notice and appreciate) without wasting resources on details that will likely escape the second user's notice anyway. As will be described in more detail below, such data streams are referred to herein as foveated streams (e.g., foveated image streams for visual data, foveated audio streams for sound data, etc.) and may have at least the benefit of being considerably smaller and more efficient than standard 3D communication streams, thereby easing bandwidth resources, processing resources, and so forth.

To this end, one implementation described herein involves a method that may be performed by a first 3D communication device used by a first user to engage in a 3D communication session with a second 3D communication device used by a second user (e.g., where the second device and the second user are located remotely from the first device and the first user). For instance, the method may include: 1) transmitting, from the first 3D communication device to the second 3D communication device, a first attention stream indicating where attention of the first user is directed; 2) receiving, from the second 3D communication device, a second attention stream indicating where attention of the second user is directed; 3) transmitting, to the second 3D communication device and based on the second attention stream, a first foveated image stream including a 3D representation of the first user; 4) receiving, from the second 3D communication device, a second foveated image stream that is transmitted based on the first attention stream and includes a 3D representation of the second user; and 5) presenting the second foveated image stream for viewing by the first user. While this implementation is described from the perspective of the first 3D communication device, it will be understood that the 3D communication link may operate by the second 3D communication performing similar functions at the same time. For example, the second 3D communication device may receive the first attention stream, transmit the second attention stream, receive the first foveated image stream, transmit the second foveated image stream, and present the first foveated image stream for viewing by the second user.

Another example implementation described herein involves a 3D communication device configured to perform the operations described above. For example, the 3D communication device may include a display screen configured to present a 3D representation of a scene (e.g., a light field display, a holographic display, etc.); a communication interface; and one or more processors communicatively coupled to the display screen and the communication interface. The processor(s) of this 3D communication device may be configured to perform a process comprising: 1) communicating, by way of the communication interface, with an additional 3D communication device to: (a) transmit a first attention stream indicating where attention of a first user of the 3D communication device is directed, (b) receive a second attention stream indicating where attention of a second user of the additional 3D communication device is directed, (c) transmit, based on the second attention stream, a first foveated image stream including a 3D representation of the first user, and (d) receive a second foveated image stream that is transmitted based on the first attention stream and includes a 3D representation of the second user; and 2) presenting the second foveated image stream on the display screen.

Yet another example implementation described herein involves a non-transitory computer-readable medium storing instructions that, when executed, cause at least one processor of a 3D communication device used by a first user to perform a process. For example, the process may include: 1) transmitting, to a second 3D communication device used by a second user, a first attention stream indicating where attention of the first user is directed; 2) receiving, from the second 3D communication device, a second attention stream indicating where attention of the second user is directed; 3) transmitting, to the second 3D communication device and based on the second attention stream, a first foveated image stream including a 3D representation of the first user; 4) receiving, from the second 3D communication device, a second foveated image stream that is transmitted based on the first attention stream and includes a 3D representation of the second user; and 5) presenting the second foveated image stream for viewing by the first user.

Various additional operations may be added to these processes and methods as may serve a particular implementation, examples of which will be described in more detail below. Additionally, it will be understood that each of the processes and operations described as being performed by different types of implementations in the examples above (e.g., the non-transitory computer readable medium, the method, the 3D communication device, etc.) may additionally or alternatively be performed by other types of implementations as well. For example, a process described above as being included in a computer readable medium could be performed as a method or could be performed by at least one processor of the 3D communication device. Similarly, the method set forth above could be encoded in instructions stored by a computer readable medium or stored within the memory of the 3D communication device, and so forth.

The details of these and other implementations are set forth in the accompanying drawings and the description below. Other features will also be made apparent from the following description, drawings, and claims.

BRIEF DESCRIPTION OF THE DRAWINGS

FIG. 3 shows an illustrative method for bilateral exchanging of user attention streams for foveated 3D communication streaming in accordance with principles described herein.

FIG. 9 shows certain aspects of an illustrative audiovisual 3D communication session in accordance with principles described herein.

DETAILED DESCRIPTION

Figure 1:
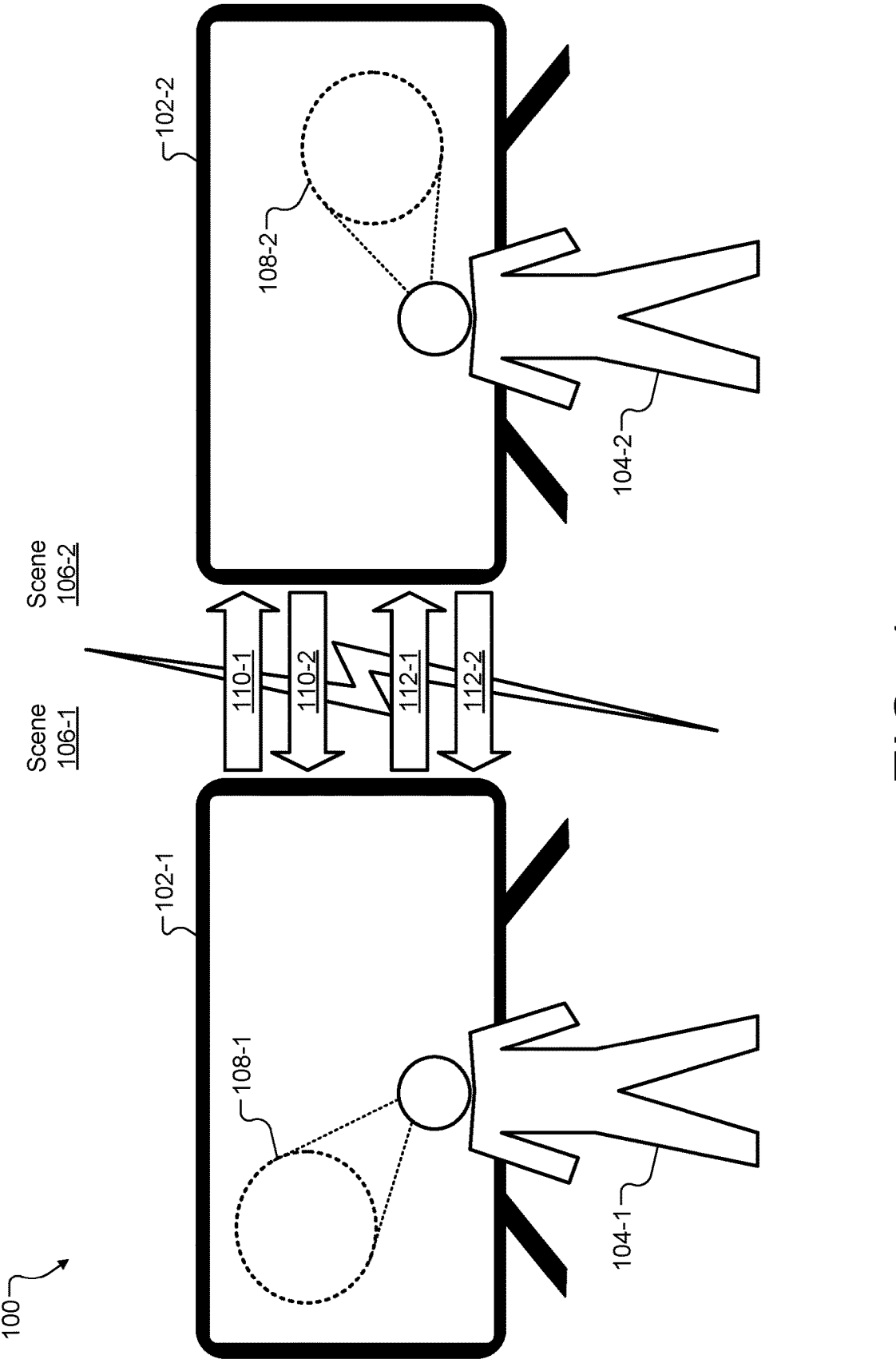
FIG. 1 shows certain aspects of one illustrative implementation of a bilateral exchange of user attention streams for foveated 3D communication streaming in accordance with principles described herein.

Three-dimensional (3D) communication technologies continue the trend, described above, of providing users with ever more immersive and realistic ways to communicate over long distances. For example, 3D communication technologies (sometimes referred to by other terms such as teleportation, telepresence, holoportation, spatial conferencing, etc.) may help create more immersive and realistic experiences for remote communication by using 3D capture and projection techniques to create, in some examples, life-sized, 3D images of people in real-time. While significant compute resources (e.g., processing resources, communication bandwidth, etc.) may be required, 3D communication may allow participants in different locations to see and interact with each other almost as if they were physically present in the same space.

Implementations described herein relate to bilateral exchanging of user attention streams for foveated 3D communication streaming. As used herein, 3D communication refers to communication between users in different places (e.g., different buildings, different cities, etc.) that utilizes 3D representations of the participating users rather than flat representations such as may be provided by a standard video call (e.g., with 2D video, mono or stereo sound, etc.). For example, in a 3D teleconferencing application, 3D communication technology may be used to create, between two 3D communication devices, a 3D teleconferencing session in which parties (e.g., single-user or multi-user parties) in different locations may see and hear life-sized, fully 3D representations of one another so that both parties can interact in a way that is experienced as being physically together at a same location. As used herein, a foveated stream of data stream refers to a stream of data that represents a subject (e.g., an image or 3D model to be displayed, audio to be presented, etc.) in an uneven manner that favors a particular part of the subject (a part that has the attention of a user) over other parts. For example, a higher quality rendering of audio and/or video may be desired where the attention of a user is directed (e.g., where the user is looking) than where the attention is not explicitly directed (e.g., in the peripheral vision of the user). Accordingly, a foveated data stream may be configured such that, when rendered, higher quality video and/or audio will be presented with respect to one region than another.

To provide an added layer of immersion and realism beyond conventional video conferencing, 3D communication links may require the transfer and processing of considerably more data than a conventional video link. As an example, subjects present in a scene (e.g., people, objects in the room, etc.) may be captured by a 3D capture mechanism within a 3D communication device. For instance, a plurality of cameras, depth scanning equipment, directional microphones, and so forth, may be used to form a 3D representation of the scene that can be presented on a 3D display screen such as a light field display or another suitable 3D display screen configured to present such a 3D representation (e.g., a holographic screen, etc.).

A given 3D communication device may be appropriately equipped with sufficient processing capability to handle the volume of data that is anticipated from whatever cameras, microphones, etc., the system includes. The exchange of the resulting data structures (e.g., 3D representations constructed from the data captured by all the cameras and microphones), however, may present a significant technical problem or challenge. For example, communication networks that may be used to carry data communications to and from a 3D communication device have a finite amount of bandwidth that is not readily expandable. If a 3D communication device is used in a home or workspace, for example, the amount of data throughout available to it may be limited by the Internet speed provided to the site, the Wi-Fi bandwidth on a wireless local area network (WLAN), and other such restraints that are outside the control of 3D communication device, regardless of how it is designed. If the available communication bandwidth available at a particular site is not enough to comfortably carry the large amounts of data produced by the 3D communication device, negative effects may be experienced such as delays in the communication (e.g., long lags or latency issues), unreliable communication (where the picture and/or sound periodically drops out as data buffers or loads), and so forth. Moreover, this technical problem may not only be limited to the 3D communication application but may also affect other systems and devices relying on the limited bandwidth as the 3D communication application dominates the available resources.

Implementations described herein present at least one technical solution to the technical problem of providing 3D communication with scarce compute resources. It may not be possible or practical to address the challenge by significantly increasing certain types of available resources. For example, the Wi-Fi and/or network bandwidth available for transferring 3D communication data at a particular site may be fixed to a certain extent and to increase the bandwidth to facilitate 3D communication may not be possible or desirable. Accordingly, implementations described herein relate to ways of reducing the total amount of data that a 3D communication device processes and transmits, even while allowing the 3D communication session to be perceived as having the same high level of detail that it would if all the data were processed and transmitted. As will be described and illustrated in detail below, this may be accomplished by both 3D communication devices bilaterally exchanging data (referred to herein as user attention streams or, more simply, as attention streams) that indicate where the attention of the respective users is directed. Based on this sharing of attention data, each 3D communication device may generate foveated communication streams that include the full level of detail only for areas where the detail is likely to be appreciated and perceived. For other areas (to which the user is paying less attention), the foveated data may be reduced in various ways that will be described herein (e.g., superpixels, lower resolution imagery, lower fidelity sound, merged sound sources, etc.).

At least one technical effect of applying this bilateral foveated communication solution to the scarce resource technical problem is that users may experience the same quality of service in their 3D communication session while significant resources are conserved. In particular, the total amount of data being transmitted from a given 3D communication device may be at a level that can be readily handled by existing infrastructure while still leaving resources for other applications and use cases. At the same time, a reliable and consistent communication experience may be enjoyed without noticeable lag or latency, without the picture or sound dropping out, and otherwise without issues that would detract from the immersive communication experience that is being provided.

Various implementations will now be described in more detail with reference to the figures. It will be understood that particular implementations described below are provided as non-limiting examples and may be applied in various situations. Additionally, it will be understood that other implementations not explicitly described herein may also fall within the scope of the claims set forth below. Systems and methods described herein for bilateral exchange of user attention streams for foveated 3D communication streaming may result in any or all of the technical effects mentioned above, as well as various additional effects and benefits that will be described and/or made apparent below.

FIG. 1 shows certain aspects of an illustrative implementation 100 of a bilateral exchange of user attention streams for foveated 3D communication streaming in accordance with principles described herein. It will be understood that while implementation 100 shows certain features and attributes that may be present in certain examples, other features and attributes not included as part of implementation 100 and/or not explicitly illustrated in FIG. 1 may also be present in other examples. For example, implementation 100 illustrates 3D communication devices in the context of a 3D teleconferencing application in which the two users engage in a 3D teleconferencing session by way of their respective 3D communication devices. Accordingly, while implementation 100 shows certain high-level aspects that may be typical to certain 3D teleconferencing implementations, various lower-level details, other features associated with other types of use cases, and so forth, will be described, illustrated, and made apparent with other examples below.

In FIG. 1, implementation 100 is shown to include two 3D communication devices 102 used by respective users 104 who are engaging in a 3D communication session (e.g., a 3D teleconferencing session). More particularly, FIG. 1 shows a first 3D communication device 102-1 used by a first user 104-1 at a first scene 106-1, and a second 3D communication device 102-2 used by a second user 104-2 at a second scene 106-2. It will be understood (as represented by the lightning symbol between 3D communication devices 102-1 and 102-2) that scenes 106-1 and 106-2 may be remote from one another to at least some degree. For example, scenes 106-1 and 106-2 could be in different countries on opposite sides of the world, or may at least be in different cities or different buildings or rooms, such that users 104-1 and 104-2 have chosen to rely on the 3D communication session instead of meeting in person.

As shown by a dotted-line cone emerging from the head of user 104-1, the attention 108-1 of user 104-1 may be directed to a particular location on the screen of 3D communication device 102-1 (an area near the top-left corner of the screen) at a particular moment that is illustrated in FIG. 1. Accordingly, that leaves a large portion of the rest of the screen that does not currently have the direct or focused attention of user 104-1 (though, it will be understood, that these areas may still be visible to the user, such as in the user's peripheral vision, etc.). 3D communication device 102-1 may detect attention 108-1 of user 104-1 in various ways described in more detail below (e.g., head tracking, eye tracking, etc.), and may indicate this attention information in a first attention stream 110-1 that is shown to be transmitted from 3D communication device 102-1 at scene 106-1 to 3D communication device 102-2 at scene 106-2.

A similar dotted-line cone emerging from the head of user 104-2 shows that the attention 108-2 of user 104-2 may be directed to a different location on the screen of 3D communication device 102-2 (an area near the middle-right side of the screen in this case) at the particular moment that is illustrated in FIG. 1. Again, this leaves most of the screen without the direct or focused attention of user 104-2 at the moment being depicted. Accordingly, 3D communication device 102-2 may detect attention 108-2 of user 104-2 in the same types of ways as attention 108-1 is being detected, and may indicate this attention information in a second attention stream 110-2 that is shown to be transmitted from 3D communication device 102-2 at scene 106-2 back to 3D communication device 102-1 at scene 106-1.

For each of the transmissions depicted in implementation 100 (including the transmissions of first attention stream 110-1 and second attention stream 110-2, described above), the data transfer may be accomplished by way of Wi-Fi, Ethernet, or other such technologies at either or both of scenes 106-1 and 106-2, and/or by way of various other networks such as wide area networks (WANs), the Internet, cellular data networks, or the like. While each transmission may be illustrated and described in sequence herein (e.g., as steps of a method or process, etc.), it will be understood that these transmissions may be streaming transmissions that are ongoing, continuous, and occur concurrently with one another during the 3D communication session. In other words, 3D communication device 102-1 may receive a continuous stream of attention data indicating attention 108-2 of user 104-2 at the same time as 3D communication device 102-1 is transmitting a continuous stream of attention data indicating attention 108-1 of user 104-1. Similarly, 3D communication device 102-2 may receive the continuous stream of attention data indicating attention 108-1 of user 104-1 at the same time as 3D communication device 102-2 is transmitting the continuous stream of attention data indicating attention 108-2 of user 104-2.

In parallel with this bilateral exchange of attention stream 110-1 and attention stream 110-2 by the 3D communication devices 102, 3D communication devices 102 may also exchange foveated communication streams (e.g., foveated image streams, foveated audio streams, a combination of the two, etc.) that are transmitted based on the respective attention streams 110-1 and 110-2. Specifically, as shown, a first foveated image stream 112-1 may be generated by 3D communication device 102-1 based on second attention stream 110-2. For example, given the information that attention 108-2 of user 104-2 is directed toward the right side of the screen of 3D communication device 102-2, first foveated image stream 112-1 may be generated in a manner that includes a high level of detail in that area on the right, but that reduces the amount of data used to represent things presented on the left (where user 104-2 is paying less attention). Foveated image stream 112-1 may employ super-pixels or other level-of-detail reductions (e.g., reducing the color detail, the depth resolution, the image resolution, etc.) to reduce the amount of data used to present the left side of the screen. As shown, foveated image stream 112-1 may be transmitted from 3D communication device 102-1 to 3D communication device 102-2 concurrently with a transmission in the opposite direction of a similarly foveated image stream 112-2. Similarly as described above for foveated image stream 112-1, foveated image stream 112-2 may be generated by 3D communication device 102-2 based on first attention stream 110-1 to reduce the level of detail in the areas where user 104-1 is directing little or no attention (e.g., the areas away from the top-left region of the screen covered by attention 108-1.

Conventional foveation schemes may reduce a level of detail being presented based on where a user is detected to be directing their attention. For example, a presentation device such as 3D communication device 102-1 may employ a foveation scheme to reduce its own processing load by expending fewer resources to process and present imagery outside of attention 108-1 of user 104-1. While this type of foveation may also be employed in a configuration such as shown in implementation 100, it will be understood that this type of one-sided (unilateral), processing-based foveation scheme is distinct from the bilateral, communicative type of foveation illustrated in FIG. 1. Specifically, in contrast with the conventional foveation example, implementation 100 presents an example in which the data stream being transmitted (e.g., foveated image stream 112-1) is what receives the foveated reduction in detail, and in which the foveated reduction is based on an attention stream representing a user in a remote location (e.g., second attention stream 110-2 representing attention 108-2 of user 104-2) rather than being based on the detected attention of the user (e.g., attention 108-1 of user 104-1) of the device performing the detail reduction.

Figure 2:
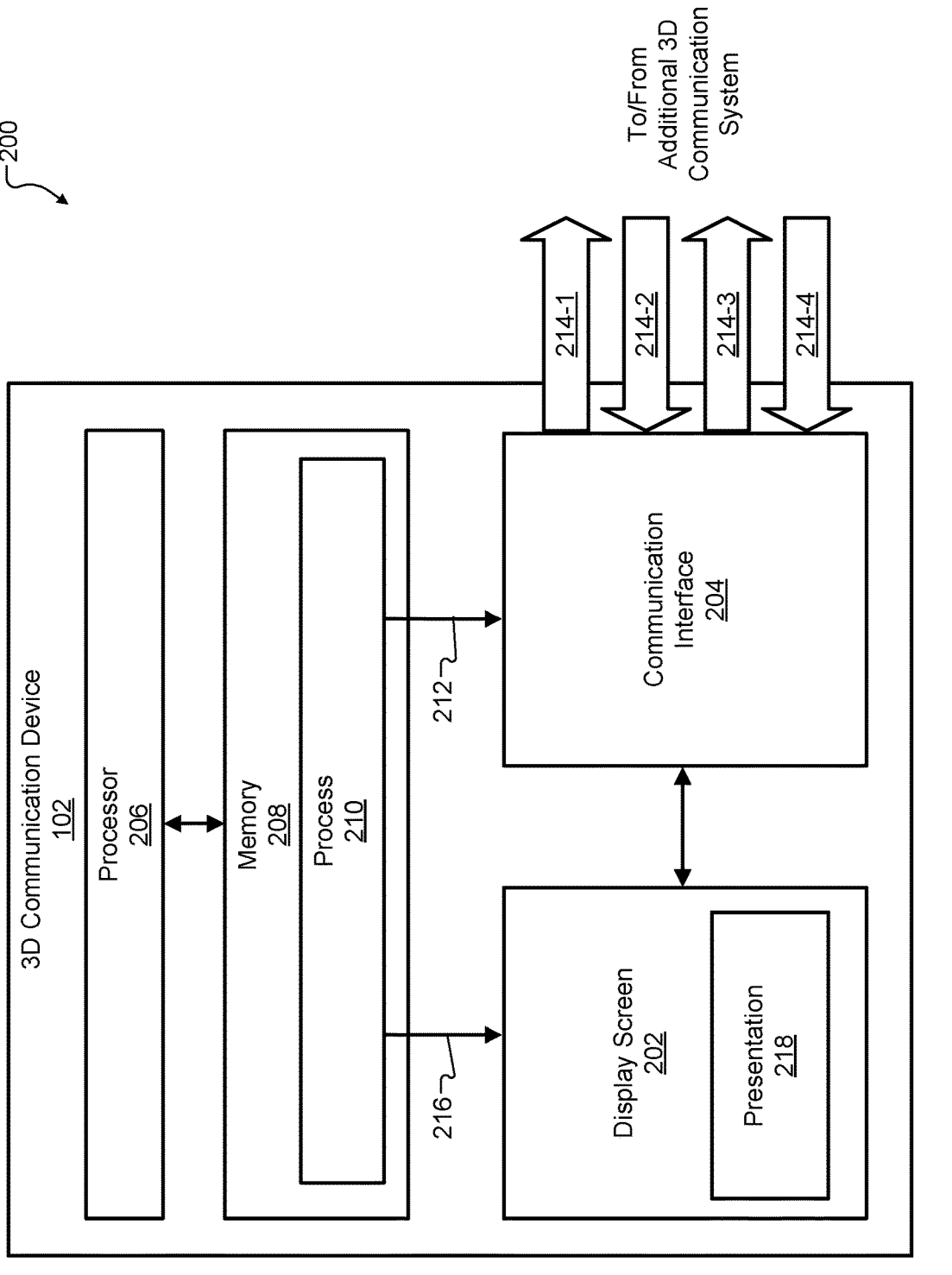
FIG. 2 shows an illustrative 3D communication device configured to perform, with another 3D communication device, a bilateral exchange of user attention streams for foveated 3D communication streaming in accordance with principles described herein.

FIG. 2 shows an illustrative implementation 200 of a 3D communication device 102 that is configured to perform, with another 3D communication device (not shown in FIG. 2), a bilateral exchange of user attention streams for foveated 3D communication streaming in accordance with principles described herein. Functions performed by this implementation of the 3D communication device (also referred to as 3D communication device 200) may implement a bilateral exchange of user attention streams for foveated 3D communication streaming similar to that described above in relation to implementation 100.

As shown, 3D communication device 200 may include a display screen 202 configured to present a 3D representation of a scene, a communication interface 204, a processor 206, and a memory 208 that stores instructions for a process 210. Processor 206 may be communicatively coupled to display screen 202 and communication interface 204 so that, when processor 206 executes the instructions encoding process 210, certain operations of process 210 may be performed with respect to display screen 202 and communication interface 204. As a first example, process 210 is shown to include an operation 212 that involves communicating, by way of communication interface 204, with an additional 3D communication device (not explicitly shown in FIG. 2) to transmit and receive various communications 214-1 through 214-4.

Processor 206 may represent or include one or more of any type of computer processor or processing resources configured to execute instructions stored in memory 208 to thereby perform process 210. In some examples, process 210 may be loaded into memory 208 from a non-transitory computer-readable medium (not shown) storing instructions that, when executed, cause processor 206 to perform process 210 in any of the ways described herein.

The communications 214 (i.e., communications 214-1 through 214-4) performed as part of operation 212 may align with data described above as being exchanged between devices in implementation 100 of FIG. 1. For example, communication 214-1 may include transmitting a first attention stream (e.g., attention stream 110-1 described above) indicating where attention of a first user (e.g., user 104-1) of 3D communication device 102 is directed. Communication 214-2 may include receiving a second attention stream (e.g., attention stream 110-2 described above) indicating where attention of a second user (e.g., user 104-2) of the additional 3D communication device is directed. Communication 214-3 may include transmitting, based on the second attention stream, a first foveated image stream (e.g., foveated image stream 112-1 described above) including a 3D representation of the first user. Communication 214-4 may include receiving a second foveated image stream (e.g., foveated image stream 112-2 described above) that is transmitted based on the first attention stream and includes a 3D representation of the second user.

It will be understood that 3D communication devices in accordance with principles described herein may include other elements not explicitly shown in 3D communication device 200. For example, audiovisual capture and reproduction equipment such as an array of cameras, an array of speakers, and so forth, may be included and used for generating and/or presenting the streaming data communicated by communication interface 204 in communications 214. For example, one or more cameras may be configured to track the attention of the first user based on how the user's head is positioned, where the user's eyes are directed, and so forth. Based on the data captured by these one or more cameras, processor 206 may generate the first attention stream for communication 214-1. Similarly, the same or different cameras may be configured to capture a 3D representation of the first user and/or other objects at the scene in which 3D communication device 102 is being used (i.e., the scene 106-1 in which the first user is located). Based on this 3D representation (and based on the second attention stream received from the additional 3D communication device), processor 206 may generate the first foveated image stream that is communicated in communication 214-3.

Process 210 is also shown to include an operation 216 by way of which processor 206 may direct display screen 202 to present the second foveated image stream (received by way of communication 214-4) on display screen 202 as a presentation 218. As mentioned above, display screen 202 may be configured to present a 3D representation of a scene (e.g., scene 106-2 represented within foveated image stream 112-2 received in communication 214-4). In some examples, this 3D representation may be configured to be viewed by the first user without other special equipment such as 3D glasses. For instance, display screen 202 may be implemented as a light field display that is configured to project the entire light field associated with the scene, rather than merely a single image of the scene as might be presented by a conventional display screen. In this example, capture equipment used to analyze and recreate the scene (e.g., cameras on the additional 3D communication system used to generate the second foveated image stream in this case) may be configured to capture not only the color of each pixel but also the direction of incoming light rays. Accordingly, when this image data is presented by a light field display, light rays may be manipulated to adjust focus and perspective, and/or to create a sense of 3D depth as the user moves their head while viewing the display.

Other types of 3D display screens other than light field displays could also implement display screen 202 in certain implementations. For instance, a conventional 3D display screen may be used that requires 3D glasses to be worn by the user; an autostereoscopic display may use certain techniques to generate a similar 3D effect without requiring 3D glasses (though there may be certain limitations in viewing angles or resolution); a lenticular display may employ a series of lenses to create different views for each eye (thereby offering at least a limited 3D effect); a volumetric display may project 3D objects using lasers, fog, or the like (at least for specific viewing zones); a head-mounted display (HMD) may use virtual reality or augmented reality to provide an immersive 3D view (albeit with dedicated equipment being required); or the like. In any of these cases, operation 216 may involve processor 206 directing display screen 202 to provide presentation 218 to the first user based on data received by way of communications 214.

One way process 210 may be performed is illustrated by an illustrative method 300 for bilateral exchange of user attention streams for foveated 3D communication streaming shown in FIG. 3. Method 300 shows one sequence of operations that may be performed by 3D communication device 200) to implement process 210. However, while FIG. 3 shows illustrative operations 302-310 according to one implementation, it will be understood that other implementations of method 300 could omit, add to, reorder, and/or modify any of operations 302-310 shown in FIG. 3. While operations shown in FIG. 3 are illustrated with arrows suggestive of a sequential order of operation, it will be understood that some or all of the operations of method 300 may be performed concurrently (e.g., in parallel) with one another. For example, multiple data streams may be transmitted and received concurrently while data that has already been received is presented. Each of operations 302-310 of method 300 will now be described in more detail as the operations may be performed by 3D communication device 200 as it is used by a first user.

At operation 302, 3D communication device 200 may transmit, to a second 3D communication device used by a second user, a first attention stream indicating where attention of the first user is directed. For example, as described above, the attention stream may be based on data captured by at least one camera and processed to determine, for instance, whether the first user is in frame and is looking at the display screen of 3D communication device 200, which direction the first user's head is facing, which way the first user's eyes are directed, and so forth. In some examples, other actions or characteristics of the first user (e.g., hand motions, where the user is pointing, etc.) may also be accounted for in determining the user's attention and generating the attention stream to be transmitted at operation 302. The attention stream transmitted at operation 302 may indicate the attention data in any manner and/or format as may serve a particular implementation, including certain formats that will be described and illustrated in more detail below.

At operation 304, 3D communication device 200 may receive, from the second 3D communication device, a second attention stream indicating where attention of the second user is directed. The second attention stream may be generated and transmitted by the second 3D communication device in the same or similar ways as described above for the first attention stream being generated and transmitted by 3D communication device 200.

At operation 306, 3D communication device 200 may transmit, to the second 3D communication device, a first foveated image stream including a 3D representation of the first user. For example, 3D communication device 200 may generate a data stream that includes image data that can be processed by the additional 3D communication device to present a 3D representation of the first user. However, since there may be a prohibitively large amount of such data to transmit all the data without encountering communication issues (e.g., overexerting the communication link with a higher rate of data than it is configured to transfer, interfering with other data being transferred over the same communication interface and/or network resources, etc.), 3D communication device 200 may reduce this data stream in accordance with the second user's attention as it is represented in the second attention stream received at operation 304. More particularly, based on the second attention stream, 3D communication device 200 may foveate the large amount of data available for the 3D representation of the first user such that a high level of detail is provided only to the extent that it is likely to be perceived by the second user. For parts of the 3D representation that do not presently have the second user's attention, a lower level of detail may be included within the first foveated image stream. This foveation may be performed in any of the ways described herein, including by representing lower-detailed areas with superpixels, lower resolution, more significant compression, and so forth.

At operation 308, 3D communication device 200 may receive, from the second 3D communication device, a second foveated image stream that includes a 3D representation of the second user. Similarly as described above with the first foveated image stream in operation 306, it will be understood that the second 3D communication device may transmit the second foveated image stream based on the first attention stream that was transmitted at operation 302. As such, the second foveated image stream received at operation 308 may be specially customized to the real-time attention of the first user, such that the second foveated image stream includes higher levels of detail for portions of the scene that currently have the first user's attention and lower levels of detail for portions of the scene that do not have the first user's attention (e.g., portions that the first user is not looking at at all or that at least are not being closely examined by the first user, such that the lower level of detail is unlikely to take away from the experience if it is noticed or perceived at all).

At operation 310, 3D communication device 200 may present the second foveated image stream for viewing by the first user. For example, the second foveated image stream may be presented on a display screen such as display screen 202 described above to allow the first user to view the second user and the scene in which the second user is located in three dimensions. In some cases, this presentation may be performed to immerse the first user in a 3D experience even without requiring 3D glasses or other special equipment to be worn (e.g., a head-mounted device, etc.). Since the image stream presented at operation 310 has been foveated based on the real-time attention of the first user (e.g., by being based on the first attention stream transmitted at operation 302), the 3D representation presented at operation 310 may include levels of detail efficiently customized to what the user will actually perceive and appreciate. For example, portions of the scene where the first user is not looking may be represented by lower levels of detail requiring less data to be transferred, while portions of the scene where the first user's attention is trained may be represented with high levels of detail that the user will enjoy and appreciate.

As operations 302-310 are continually and concurrently performed throughout a session, the high-detail and low-detail portions of the scene may dynamically change in accordance with the first user's real-time attention, thereby always ensuring that the user perceives a high level of detail while the system benefits from the efficiency of sending a significantly reduced data load.

Figure 4:
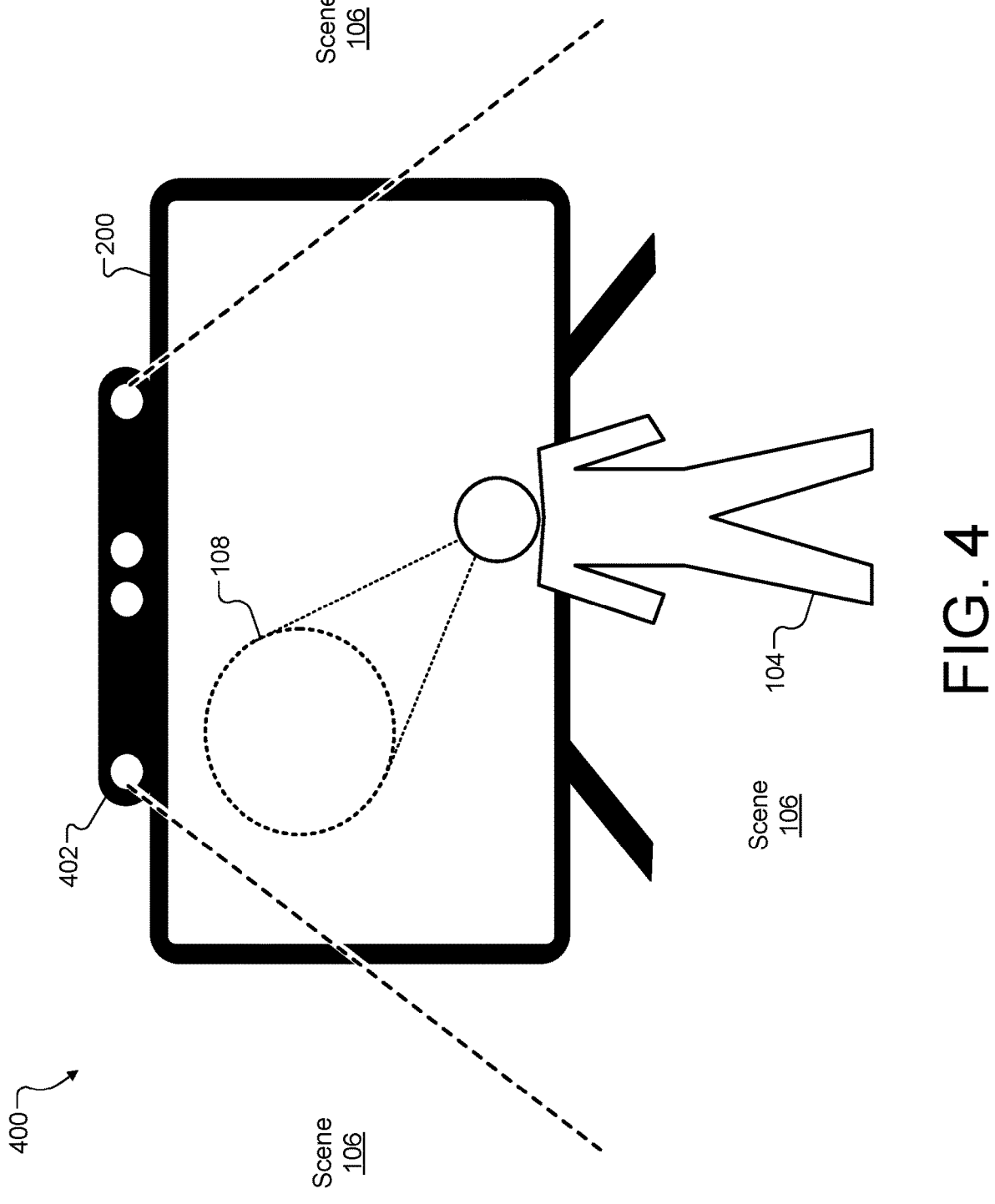
FIG. 4 shows certain aspects of an illustrative 3D communication session in which a 3D communication device is used by a user in accordance with principles described herein.
Figures 5A, 5B:
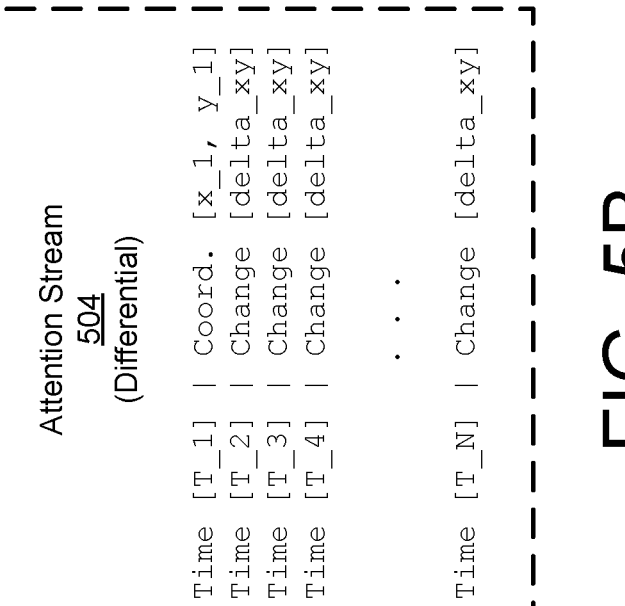
FIGS. 5A-5B show certain aspects of illustrative user attention streams in accordance with principles described herein.
Figure 6:
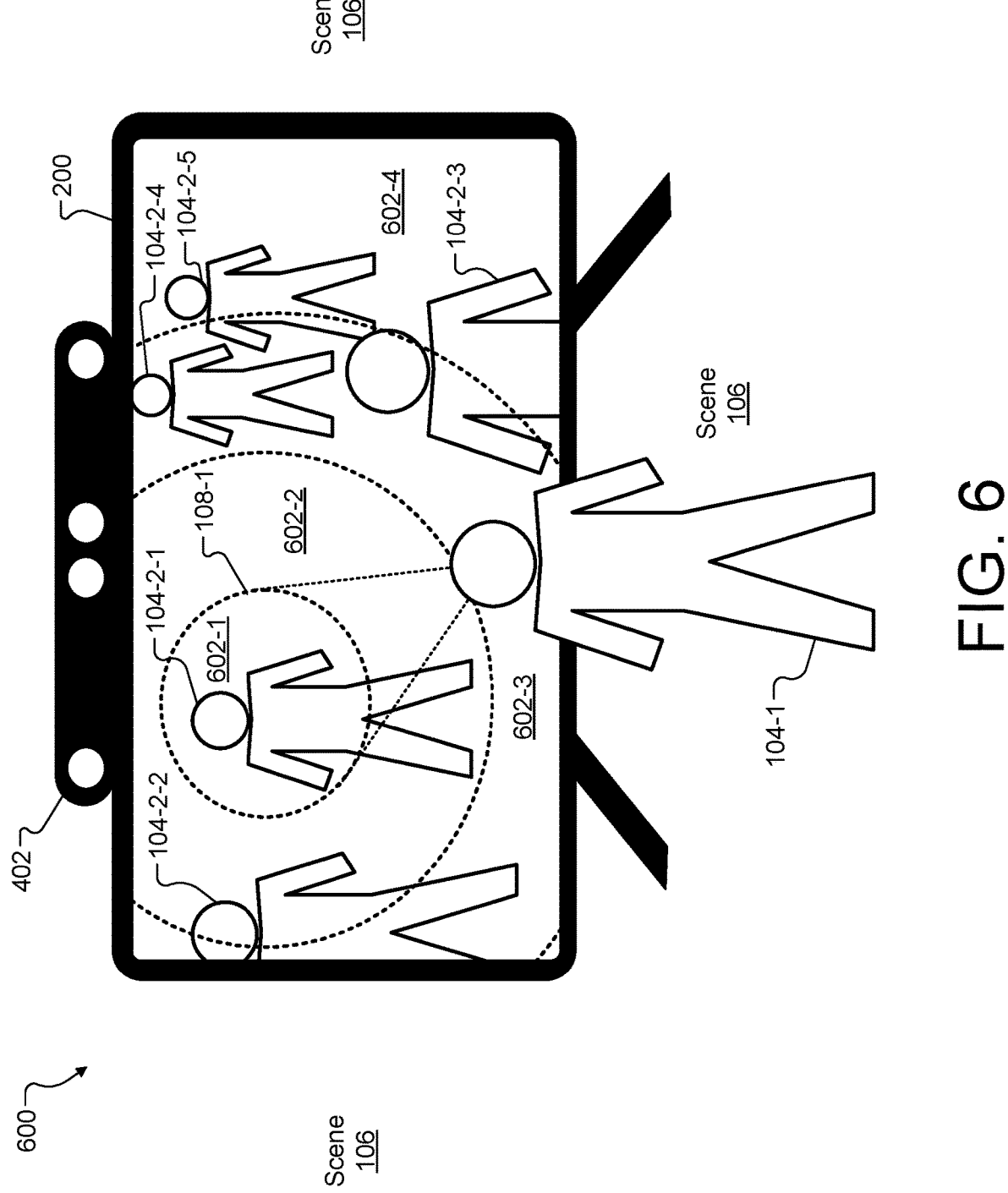
FIG. 6 shows certain aspects of an illustrative 3D communication session in which a 3D communication device is used to communicate with a plurality of users at a remote scene in accordance with principles described herein.
Figure 7:
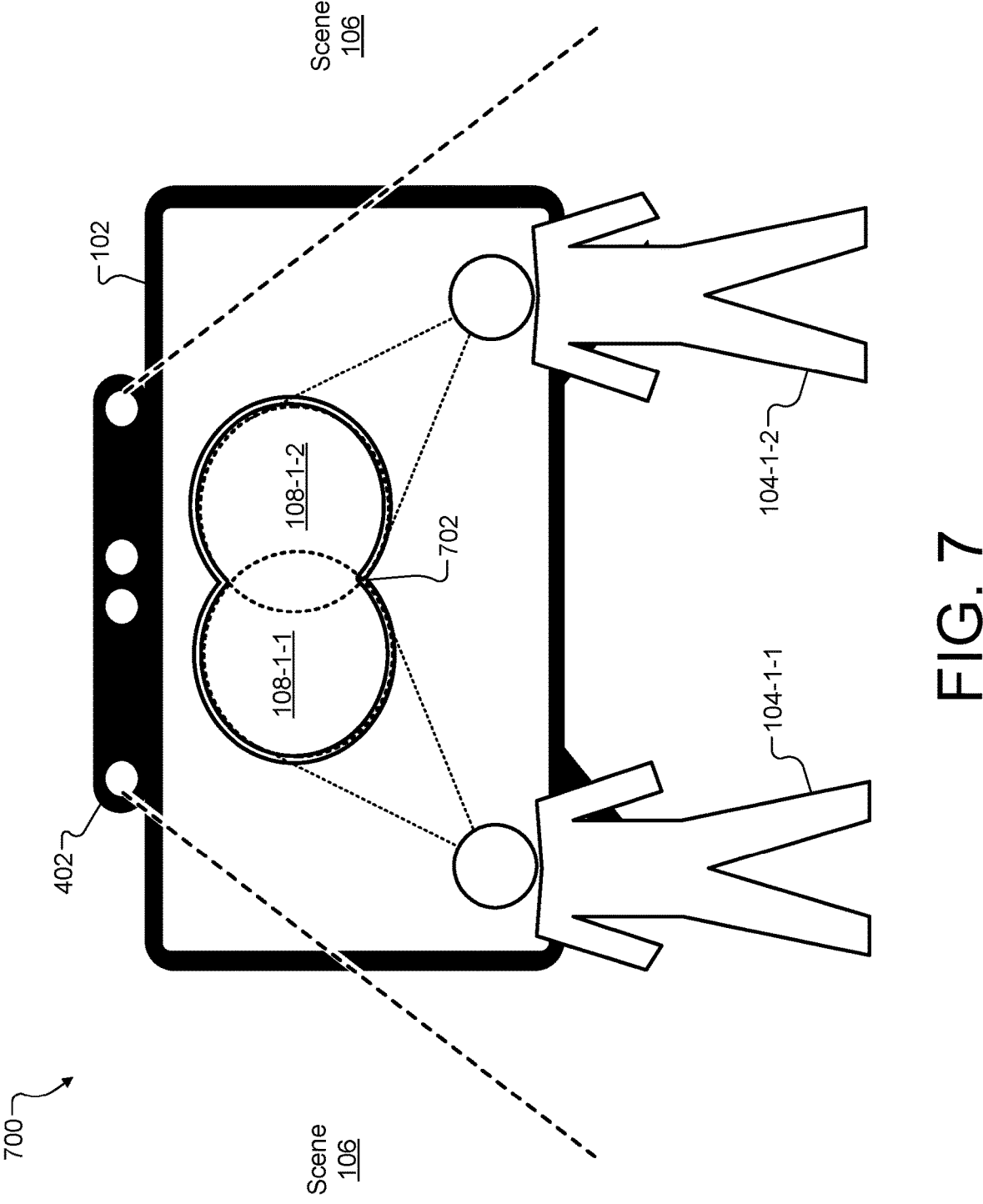
FIG. 7 shows certain aspects of an illustrative 3D communication session in which a 3D communication device is used by a plurality of users in accordance with principles described herein.
Figure 8:
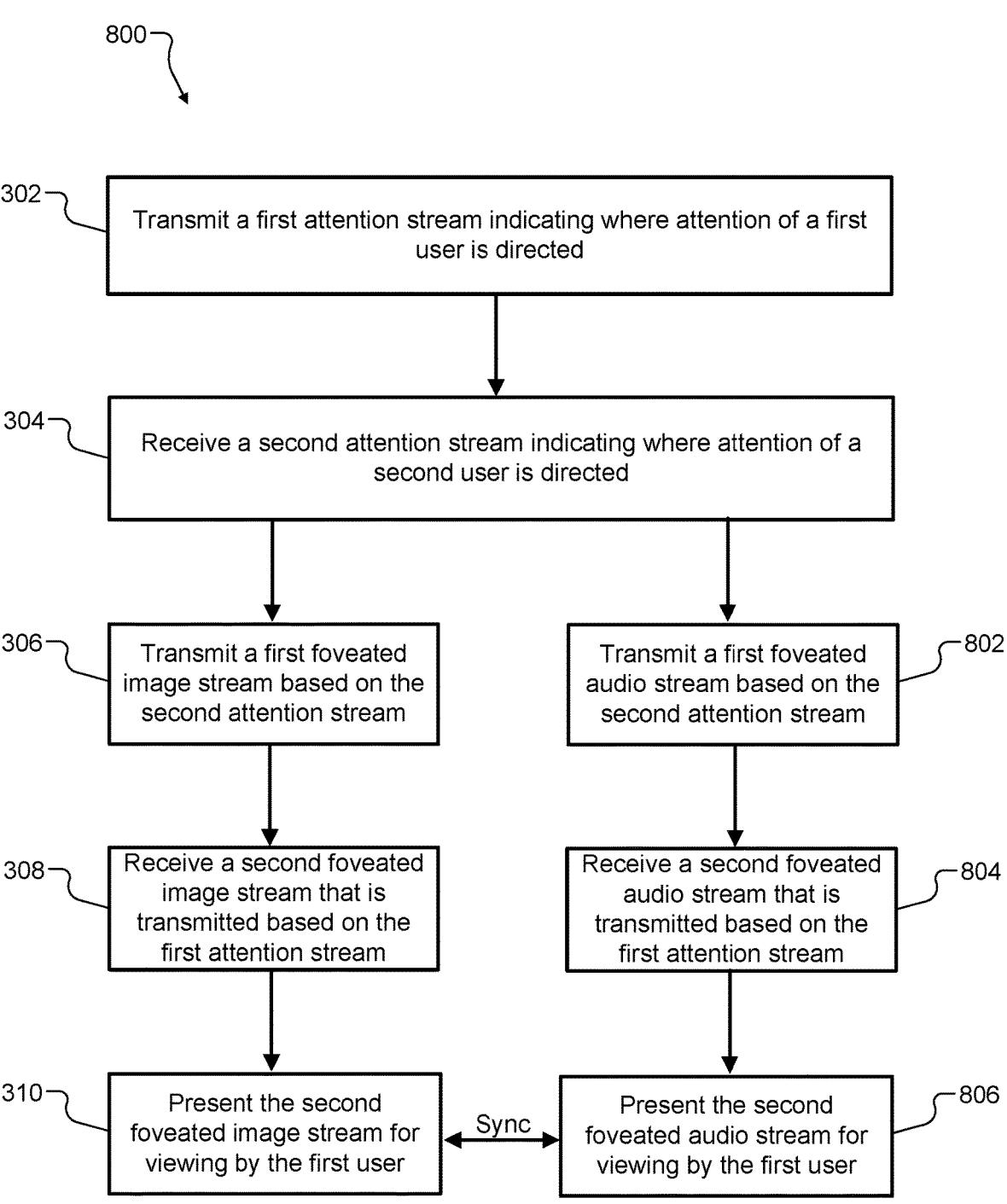
FIG. 8 shows an illustrative method for bilateral exchanging of user attention streams for foveated audiovisual 3D communication streaming in accordance with principles described herein.

Having described certain principles of how 3D communication devices such as 3D communication device 200 may function to bilaterally exchange user attention streams for foveated 3D communication streaming, various additional details, variations, and additional features that may be included in certain implementations will now be described in relation to FIGS. 4-9. In FIGS. 4, 5A, and 5B, certain aspects of how user attention is detected, represented, and exchanged will be described and illustrated. In FIG. 6, certain aspects of how different portions of a scene are represented in a foveated image stream will be described and illustrated. In FIG. 7, an implementation will be described and illustrated that supports a plurality of users using the 3D communication device at once. In FIGS. 8-9, various aspects of foveated 3D audio will be described in connection with foveated 3D imagery that has been the focus of much of the rest of the present disclosure.

FIG. 4 shows certain aspects of an illustrative 3D communication session 400 in which a 3D communication device is used by a user in accordance with principles described herein. More particularly, as shown, 3D communication device 200 (e.g., an implementation of 3D communication device 102-1 of FIG. 1) is shown to be used by a user 104 (e.g., representing user 104-1 of FIG. 1) within a scene 106 (e.g., representing scene 106-1 of FIG. 1). At the moment being illustrated in FIG. 4, user 104 is shown to be directing their attention 108 to a particular portion of the display screen (e.g., display screen 202) of 3D communication device 200. In this case, the particular portion is a bit to the left and above the center of the display screen, as shown.

At least one camera in an array of cameras 402 integrated within (or otherwise associated with and communicatively coupled to) 3D communication device 200 is shown to be capturing images from scene 106. For example, as the dashed lines originating from the array of cameras 402 illustrate, the cameras may have a field of view looking into scene 106 and including user 104 as the user stands before the 3D communication device 200 during the 3D communication session. The array of cameras 402 may capture images of user 104 and/or other people and objects within scene 106. As has been described, these images may be used to generate streams of data including an attention stream (e.g., the first attention stream 110-1) and a foveated image stream (e.g., the foveated image stream 112-1).

More particularly, image data captured by the array of cameras 402 may be used to determine where attention 108 of user 104 is trained at a given moment in time so that this information may be incorporated into an attention stream (i.e., the first attention stream 110-1) that can be communicated to another 3D communication device (e.g., by way of communication 214-1). To this end, 3D pupil localization techniques and/or other suitable techniques may be used to estimate the gaze of user 104 in head space. Then, based on camera calibration that has been performed to correlate a camera space for the array of cameras 402 and a screen space for the display screen of 3D communication device 200, predetermined extrinsic parameters describing this relationship may be used to convert the 3D gaze vector of user 104 from the user's head to a projection onto the screen (as illustrated by attention 108).

FIGS. 5A-5B show certain aspects of illustrative user attention streams in which the metadata indicative of attention 108 may be represented and transmitted once it has been determined in the ways described above in relation to FIG. 4. More particularly, FIG. 5A shows an attention stream 502 that indicates the gaze of the user (e.g., attention 108) with respect to the display screen as a list of independent metadata entries. As shown, for example, attention stream 502 includes a first entry (the first line of attention stream 502) that indicates a first timestamp ("Time [T_1]") and a first set of screen coordinates ("Coord. [x_1, y_1]") indicating what portion of the display screen has the user's attention 108 at time T1, a second entry (the second line of attention stream 502) that indicates a second timestamp ("Time [T_2]") and a second set of screen coordinates ("Coord. [x_2, y_2]") indicating what portion of the display screen has the user's attention 108 at time T2, and so forth for a total of N entries during a communication session. Different entries may be added to attention stream 502 at any suitable rate to ensure that foveation of the communication stream is relevant and timely. For example, entries may be generated and transmitted once every few seconds, once per second, several times per second, or at any other suitable rate as may serve a particular implementation.

The coordinates of each entry may be formatted in any suitable way so as to indicate where the user's attention 108 has been detected to be. For instance, a circular area of attention such as illustrated by attention 108 in FIG. 4 may be specified by including, within each entry of attention stream 502, a point in screen space (represented by x-y coordinates) that will be treated as a center point of a circular attention area having a predetermined radius. In other examples, the center point and the radius could both be specified in each entry (allowing for the radius to be variable based on, for instance, how close the user is standing to the screen, how fixed or active the users eyes are behaving, etc.), coordinates for two opposite corners of a rectangular attention area could be specified in each entry, or other suitable shapes defined by other suitable coordinates could similarly be specified.

Given that the bilateral exchange of user attention streams described herein aims to ultimately help reduce the communication bandwidth used for a 3D communication session, it may be desirable to make the attention streams themselves efficient in terms of data usage. Though these streams may use far less bandwidth than, for example, the 3D communication streams themselves (including 3D images, 3D audio, etc.), attention streams that include entries with precise floating point coordinates several times per second (and possibly for multiple users, as will be described in more detail below) may nevertheless add up to a significant amount of data that may be desirable to manage and keep to a reasonable rate. Accordingly, rather than listing independent entries such as shown in attention stream 502 of FIG. 5A, it may be more efficient in some examples for the attention streams to be represented using a differential format that indicates how user attention changes or, in other words, how the attention is different at a present point in time as compared to a previous point in time.

To illustrate, FIG. 5B shows an attention stream 504 that represents a differential attention stream that is shown to include a first (and possibly periodic) independent entry similar to the entries of attention stream 502. Attention stream 504 then includes a list of dependent entries that each indicate, for a respective timestamp, a change in the user's attention as compared to the previous entry ("Change [delta_xy]"). For example, if the user's attention has not changed since the last entry was sent on attention stream 504, or at least has not changed more than a particular threshold, a differential entry may include just a few bits to indicate that no change has been made. Similarly, if the change is small, the amount of data used to represent the change may be considerably less than would be used to independently represent an entire attention area. Accordingly, while an integrative analysis may be required on the receiving end to convert change entries to actual attention areas for the foveation of the communication stream, the transmission of a differential attention stream such as attention stream 504 may reduce the bandwidth needed to exchange the attention streams to the overall benefit of the system.

FIG. 6 shows certain aspects of an illustrative 3D communication session 600 in which 3D communication device 200 is used by user 104-1 at scene 106-1 (described in relation to FIG. 1) to communicate with a plurality of users at a remote scene (e.g., scene 106-2). While the remote scene is not explicitly shown in FIG. 6 as scene 106-2 was shown in FIG. 1, it will be understood that the single user 104-2 described in relation to FIG. 1 has been replaced with a plurality of users 104-2 (labeled as users 104-2-1, 104-2-2, 104-2-3, 104-2-4, and 104-2-5) that are all participating together in 3D communication session 600.

One principle illustrated by FIG. 6 is that at least one side of a 3D communication may include multiple users, each of whom may direct their attention in slightly or drastically different ways at various times. It will be understood that the attention stream received by 3D communication device 200 (from the 3D communication device being used by the plurality of users 104-2 illustrated in FIG. 6) may incorporate information about the attention of each of the users so that the foveated communication streams generated and transmitted by 3D communication device 200 may take that into account. This principle will be further explained in relation to FIG. 7, which illustrates a 3D communication session in which multiple users concurrently communicate using 3D communication device 200.

Another principle illustrated by FIG. 6 is how and why attention 108-1 may tend to jump around the display screen of 3D communication device 200. For example, while attention 108-1 of user 104-1 is shown to be trained approximately at a user 104-2-1 at the moment illustrated in FIG. 6, it is easy to anticipate that user 104-1 may adjust their attention to other users 104-2 as each of them addresses the 3D communication device (i.e., talking to user 104-1) at different times. For instance, this may occur if the group of users 104-2 are in a meeting with user 104-1, are greeting user 104-2 to wish them a happy birthday, or the like. For any given location of attention 108-1, FIG. 6 shows that there may be at least two, and possibly a plurality of three or more, different portions of the remote scene all represented in different ways and/or at different levels of detail. For example, the circular area of attention 108-1 and concentric circles emanating out therefrom serve to mark various regions of the scene that may be represented at different levels of detail within the second foveated image stream being presented by 3D communication device 200. More particularly, as shown, the second foveated image stream being presented to user 104-1 by 3D communication device 200 is shown to include data representing: 1) a first portion 602-1 of a scene (e.g., scene 106-2) in which the second user (e.g., user 104-2-1) is located, the first portion represented at a first level of detail (e.g., a full level of detail or the highest level for which the system is configured); 2) a second portion 602-2 of the scene represented at a second level of detail lower than the first level of detail; and 3) a third portion 602-3 of the scene represented at a third level of detail lower than the second level of detail.

It will be understood that certain implementations may include fewer than three portions of the scene represented at fewer than three levels of detail (e.g., an example with only two levels of detail). Additionally, other implementations may include more than three portions of the scene represented at more than three different levels of detail. For instance, FIG. 6 further shows a fourth portion 602-4 of the scene that may be represented at a fourth level of detail lower than the other levels. Additionally or alternatively, the third portion 602-3 could include the remainder of the scene that is outside the immediate areas of the user's attention (i.e., portions 602-1 and 602-2). As yet another example, rather than discrete portions of differing (increasingly low) levels of detail moving away from portion 602-1 where attention 108-1 is placed, a continuous drop off of detail may be implemented outside of that portion (or outside another suitable portion such as second portion 602-2).

Regardless of the number of regions or portions the scene is divided into for a particular implementation, the second foveated image stream may be configured to provide decreasing levels of detail outside the attention 108-1 of user 104-1 using any suitable methods, techniques, or algorithms as may serve a particular implementation. For example, as has been mentioned, one way to reduce the level of detail (and to thereby reduce the amount of data that is transmitted for the foveated image stream) is to reduce the resolution of the image in those portions that do not have the user's attention. This is because representing fewer pixels in these regions allows less data to be transmitted. Similarly, the foveated image streams being exchanged may use superpixels to represent certain portions of the scene in which the users are located. That is, groups of pixels having common characteristics may be processed and transmitted based on the groupings, such that data needed to represent individual pixels and minor differences between pixels in a group is reduced. Other ways to reduce the data for regions represented with lower levels of detail include reducing the depth resolution that is communicated, reducing the color spectrum available to each pixel, compressing the data using more aggressive (and potentially lossy) algorithms, and so forth.

As mentioned above, FIG. 6 shows an example in which multiple users 104-2 are present in scene 106-2, such that user 104-1 may tend to shift their attention from place to place as different users 104-2 speak. Of course, just as FIG. 6 illustrates that a second user (e.g., user 104-2-1) may be included in a second plurality of users 104-2 located at a second scene (i.e., users 104-2-1 through 104-2-5 located at scene 106-2), the first user 104-1 also may be included in a first plurality of users located at first scene 106-1. In both multi-user cases, the question of where attention is being directed and what portions of the scene can be safely reduced in level of detail without disrupting the experience becomes more complex. For example, rather than an attention 108-1 or 108-2 of a single user, the attention of multiple users may be accounted for in a way that combines the attention into a composite. For example, in a 3D communication session between a first plurality of users in a first scene and a second plurality of users in a second scene, a first attention stream (e.g., analogous to attention stream 110-1) may be a first composite attention stream indicating where attention of each of the first plurality of users is directed with respect to the second scene. Similarly, a second attention stream (e.g., analogous to attention stream 110-2) may be a second composite attention stream indicating where attention of each of the second plurality of users is directed with respect to the first scene.

To illustrate, FIG. 7 shows certain aspects of an illustrative 3D communication session 700 in which 3D communication device 200 is used by a plurality of users 104-1 (i.e., users 104-1-1 and 104-1-2). While a corresponding plurality of users 104-2 is not shown in FIG. 7, it will be understood that there may be one or more users on the other side of the 3D communication link with whom the plurality of users 104-1 is communicating. Additionally, while only two users 104-1 are shown in this example, it will be understood that a plurality of any suitable number of users may be handled in accordance with the principles described here, albeit with potentially diminishing returns as the number of users grows and the portions of the scene without any user's attention may tend to decrease.

As shown in FIG. 7, user 104-1-1 is detected to be directing their attention 108-1-1 to a portion of the scene being presented near the middle of the display screen (a little above and to the left of center). User 104-1-2, by contrast, is shown to be directing their attention 108-1-2 to a nearby portion of the scene that is overlapping but not identical to where attention 108-1-1 is located (a little above and to the right of center of the display screen). A composite attention 702 is shown to incorporate both attention 108-1-1 and 108-1-2, thereby forming, in this example, a shape similar to a figure-eight. It will be understood that composite attention 702 may be a smaller shape if the attention of both users 104-1 is more similar (i.e., centered on a more common portion of the scene). Additionally, composite attention 702 may be a larger shape or even may include multiple, disconnected shapes if the attention of both users 104-1 is more disparate (i.e., if they are paying attention to very different portions of the scene). Composite attention 702 may be represented in a composite attention stream using similar principles as described above for either attention stream 502 and/or attention stream 504, though it will be understood that such composite attention streams may require more data to represent than non-composite attention streams associated with only one user (such as illustrated by the examples of FIGS. 5A and 5B). Additionally, as mentioned above, as more users are added to a scene and their attention becomes more disparate and spread across the scene being presented, diminishing returns in data reduction of foveated image streams may be encountered. As long as there are at least some portions of a scene that do not have the direct attention of any users on the other side, however, at least some data reduction may be produced by the implementations of foveated 3D communication streaming described herein.

Just as visual levels of detail are generally most desired in portions of a presentation where users are directing their eyes, audio detail may also tend to be most noticed and appreciated when sound originates from where a user's visual attention is directed. For example, if a user's attention, during a conference call with several other users, is directed toward a first person who is speaking rather than toward two other people who are having a side conversation, it may be desirable that the user be able to perceive a higher level of detail (e.g., audio fidelity and quality, volume, accurate 3D directionality, etc.) for the sound originating from the first person than for sound originating from the two other people. Accordingly, while the description above has largely focused on visual aspects of the 3D communication experience (e.g., analyzing where users are directing visual attention, producing foveated image streams, etc.), it will be understood that analogous principles may also apply to the audio portion of the 3D communication (e.g., to produce foveated audio streams, etc.). One notable distinction, however, is that audio foveation may still be based on visual attention (e.g., where users are detected to be looking) rather than auditory attention (e.g., where users are trying to listen), since there may be no readily detectable way of determining auditory attention (analogous to how visual attention is readily revealed by head and eye tracking), and since visual attention tends to generally be a good proxy for auditory attention anyway.

To illustrate how certain audio aspects may be integrated with the visual aspects that have been described, FIG. 8 shows an illustrative method 800 for bilateral exchanging of user attention streams for foveated audiovisual 3D communication streaming in accordance with principles described herein. As shown, the same operations 302-310 are present in method 800 as were illustrated and described above in relation to method 300 of FIG. 3, and method 800 will be understood to include the same characteristics described above in relation to method 300 (e.g., parallel and concurrent operations, etc.). In particular, as shown, a 3D communication device such as 3D communication device 200 may perform operation 302 by transmitting the first attention stream to the additional 3D communication device, perform operation 304 by receiving the second attention stream from the additional 3D communication device, perform operation 306 by transmitting the first foveated image stream based on the received second attention stream, perform operation 308 by receiving the second foveated image stream (which may have been transmitted based on the transmitted first attention stream), and perform operation 310 by presenting the second foveated image stream for viewing by the user of the 3D communication device (e.g., user 104-1 of 3D communication device 200).

Along with operations 302-310, method 800 is further shown to include several audio-related operations 802-806 that correspond with, and/or are otherwise performed in parallel with, certain of the image-related operations 302-310. Each of these operations will now be described in more detail with reference to FIG. 8 and, in some cases, with reference to FIG. 9, which shows certain aspects of an illustrative audiovisual 3D communication session 900 in accordance with principles described herein.

At operation 802, 3D communication device 200 may transmit, to the additional 3D communication device, a first foveated audio stream including a first 3D audio representation for the first scene in which the first user is located (e.g., scene 106-1 in which user 104-1 is located). As described above, since it may not be readily apparent where the first user is trying to focus their listening, their visual attention (e.g., attention 108-1) may be used as a proxy for their auditory attention and this transmitting of the first foveated audio stream may be performed based on the second attention stream received at operation 304.

In order to transmit the first foveated audio stream at operation 802, 3D communication device 200 may also be configured to generate the first foveated audio stream (e.g., in parallel with generating the first foveated image stream and as an additional operation not shown in method 800). For example, the generating of the first foveated audio stream may include: 1) identifying a plurality of sound sources within the first scene, the plurality of sound sources including a first sound source and a second sound source; and 2) determining, with respect to a coordinate system associated with the first scene, first coordinates for the first sound source and second coordinates for the second sound source.

The identification of the sound sources may be performed in any suitable manner as may serve a particular implementation. For example, a nonparametric source separator (e.g., using an M-grid quantization of the sound space) may be used to identify various sound sources and determine where the sources are located with respect to the local coordinate system (e.g., thereby indicating how close to the screen they are located, what side of the room they are located in, etc.). In some implementations, a three-dimensional coordinate system associated with the first scene (and the position of the 3D communication device within the scene) may be employed. In other implementations, the coordinate system may be a two-dimensional coordinate system associated with the screen space itself. In this case, proximity to the screen (which may serve as something like a third dimension) may be tracked and handled separately. However the coordinate system is defined, this generating of the foveated audio stream may essentially involve reconstructing the sound field of the first scene, determining how many sound sources are present and where they are located with respect to the 3D communication device, and so forth. It will be understood that there may be various ways of determining and representing this information for purposes of generating the first foveated audio stream.

Another action that may be part of the generating of the first foveated audio stream that is to be transmitted at operation 802 is to rank the separated sound sources based on the second user's attention (e.g., based on the second attention stream received at operation 304) and based on the locations of the sound sources (e.g., their proximity to the screen or to the second user's attention, etc.). More particularly, for example, the generating of the first foveated audio stream may further include ranking, based on the first coordinates and the second coordinates, the first sound source with respect to the second sound source. For instance, the first sound source may be ranked higher (e.g., as more important) or lower (e.g., as less important) than the second sound source. Accordingly, the first 3D audio representation included within the first foveated audio stream may include data indicative of the first coordinates, the second coordinates, and the ranking of the first sound source with respect to the second sound source. For example, the foveated audio stream may indicate a ranked list of the first and second sound sources (as well as any additional sound sources as may happen to be detected) so that the presentation of the audio stream may account for which sound sources are to be presented with higher and lower levels of detail.

To illustrate, FIG. 9 shows the 3D communication session 900 in which a user 104-1 uses 3D communication device 200 in scene 106-1 to communicate with a plurality of other users in a remote scene (e.g., users 104-2 in scene 106-2, though these users are not labeled in FIG. 9). As shown, each of the remote users may be speaking or at least making some amount of sound that is being picked up by the remote 3D communication device. As such, each of the users is drawn to be originating sound waves and is labeled as a particular sound source 902 (e.g., sound sources 902-1 through 902-5). At the moment illustrated in FIG. 9, the visual attention 108-1 of user 104-1 is shown to be directed toward the user labeled as sound source 902-1. Accordingly, in a sound map 904 that may be included with the transmission of the foveated audio stream, the top-ranked sound source is shown to be "Source 1" (i.e., sound source 902-1) at coordinates "Coord. 1." Other sound sources represented within sound map 904 are each shown to have been separated and individually identified (e.g., using the techniques described above), but as these sound sources 902 become progressively farther and farther from attention 108-1, they are shown to be ranked with lower and lower importance on sound map 904 by being further down the ranked list. Specifically, the second-ranked sound source is shown to be "Source 2" (i.e., sound source 902-2) at coordinates "Coord. 2," the third-ranked sound source is shown to be "Source 3" (i.e., sound source 902-3) at coordinates "Coord. 3," the fourth-ranked sound source is shown to be "Source 4" (i.e., sound source 902-4) at coordinates "Coord. 4," and the last-ranked sound source is shown to be "Source 5" (i.e., sound source 902-5) at coordinates "Coord. 5."

Returning to FIG. 8, at operation 804, 3D communication device 200 may receive from the additional 3D communication device (e.g., second 3D communication device 102-2), a second foveated audio stream that was generated by the additional 3D communication device in a similar way as described above for the first foveated audio stream transmitted at operation 802. That is, the second foveated audio stream received at operation 804 may be transmitted (e.g., by the additional 3D communication device) based on the first attention stream (that is transmitted at operation 302) and may include a second 3D audio representation for the second scene in which the second user is located (or in which the plurality of users shown in FIG. 9 are located). As part of the second foveated audio stream, 3D communication device 200 may further receive a ranked list of sound sources such as illustrated by sound map 904.

At operation 806, 3D communication device 200 may present the second foveated audio stream received at operation 804 in synchronization ("Sync") with the second foveated image stream received at operation 308. In other words, an immersive audiovisual communication including a presentation of both video and audio information may be provided to allow the first user (or plurality of users) to perceive that they are speaking with the second user (or plurality of users) almost as if they were together in a same location. For example, the second foveated audio stream may be presented using an array of speakers associated with (e.g., incorporated within) 3D communication device 200 and configured to present 3D audio (e.g., to present audio in a spatial manner that causes it to be perceived as originating from points in 3D space).

By the nature of the foveation techniques described herein, it will be understood that the second foveated audio stream may include reduced data as compared to all the data that may be captured and available to the additional 3D communication device at the second scene. For example, lower ranked sound sources may be represented with lower audio fidelity, higher compression, and so forth. Additionally, however, if the ranked list of sound sources (e.g., a sound map analogous to sound map 904 described above) is provided together with the second foveated audio stream, the presentation at operation 806 of the foveated audio stream may be made more resource-efficient by reducing the number of sources for which a full head-related transfer function (HRTF) convolution is performed. More specifically, for instance, the second 3D audio representation included within the second foveated audio stream may include data indicative of first coordinates of a first sound source within the second scene, second coordinates of a second sound source within the second scene, and a ranking of the first sound source with respect to the second sound source. As such, the presenting of the second foveated audio stream at operation 806 may include simplifying an HRTF convolution of at least one of the first sound source or the second sound source (e.g., by combining them with other sound sources within the 3D sound field, etc.) based on the first coordinates, the second coordinates, and the ranking.

As has been mentioned, various methods and processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EE-PROM, any other memory chip or cartridge, or any other tangible medium from which a computer can read.

Figure 10:
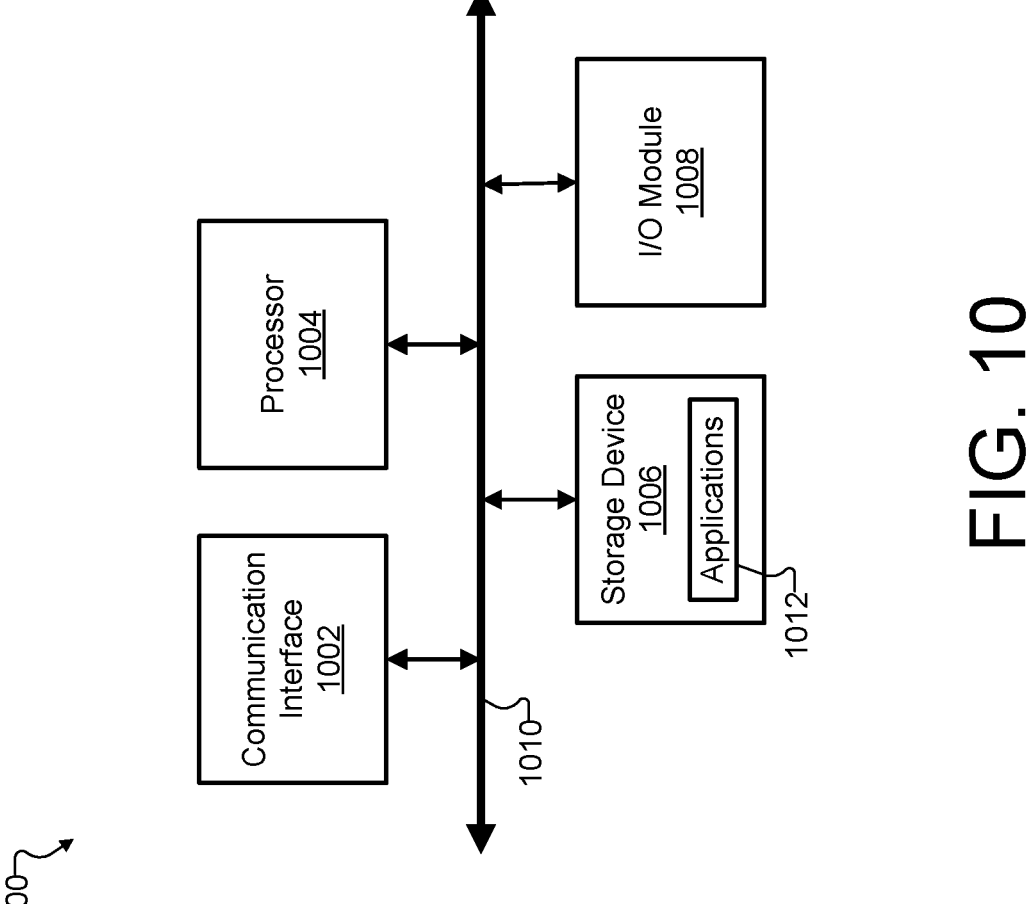
FIG. 10 shows an illustrative computing system that may be used to implement various devices and/or systems described herein.

FIG. 10 shows an illustrative computing system 1000 that may be used to implement various devices and/or systems described herein. For example, computing system 1000 may include or implement (or partially implement) 3D communication devices such as 3D communication devices 102-1 and 102-2, any implementations thereof (e.g., 3D communication device 200), any components thereof (e.g., components illustrated in FIG. 2), and/or other devices used therewith.

As shown in FIG. 10, computing system 1000 may include a communication interface 1002, a processor 1004, a storage device 1006, and an input/output (I/O) module 1008 communicatively connected via a communication infrastructure 1010. While an illustrative computing system 1000 is shown in FIG. 10, the components illustrated in FIG. 10 are not intended to be limiting. Additional or alternative components may be used in other embodiments. Components of computing system 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. One or more I/O modules may be used to receive input for a single virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

The following examples describe implementations of bilateral exchanging of user attention streams for foveated 3D communication streaming in accordance with principles described herein:

1. A method comprising: transmitting, from a first 3D communication device used by a first user to a second 3D communication device used by a second user, a first attention stream indicating where attention of the first user is directed; receiving, from the second 3D communication device, a second attention stream indicating where attention of the second user is directed; transmitting, to the second 3D communication device and based on the second attention stream, a first foveated image stream including a 3D representation of the first user; receiving, from the second 3D communication device, a second foveated image stream that is transmitted based on the first attention stream and includes a 3D representation of the second user; and presenting the second foveated image stream for viewing by the first user.

2. The method of any of the preceding examples, further comprising: transmitting, to the second 3D communication device and based on the second attention stream, a first foveated audio stream including a first 3D audio representation for a first scene in which the first user is located; receiving, from the second 3D communication device, a second foveated audio stream that is transmitted based on the first attention stream and includes a second 3D audio representation for a second scene in which the second user is located; and presenting the second foveated audio stream in synchronization with the second foveated image stream.

3. The method of any of the preceding examples, further comprising generating the first foveated audio stream, the generating the first foveated audio stream including: identifying a plurality of sound sources within the first scene, the plurality of sound sources including a first sound source and a second sound source; and determining, with respect to a coordinate system associated with the first scene, first coordinates for the first sound source and second coordinates for the second sound source.

4. The method of any of the preceding examples, wherein: the generating the first foveated audio stream further includes ranking, based on the first coordinates and the second coordinates, the first sound source with respect to the second sound source; and the first 3D audio representation included within the first foveated audio stream includes data indicative of the first coordinates, the second coordinates, and the ranking of the first sound source with respect to the second sound source.

5. The method of any of the preceding examples, wherein: the second 3D audio representation included within the second foveated audio stream includes data indicative of first coordinates of a first sound source within the second scene, second coordinates of a second sound source within the second scene, and a ranking of the first sound source with respect to the second sound source; and the presenting the second foveated audio stream includes simplifying a head-related transfer function (HRTF) convolution of at least one of the first sound source or the second sound source based on the first coordinates, the second coordinates, and the ranking.

6. The method of any of the preceding examples, wherein the first attention stream and the second attention stream are represented using a differential format that indicates how user attention is different at a present point in time as compared to a previous point in time.

7. The method of any of the preceding examples, wherein the second foveated image stream includes data representing: a first portion of a scene in which the second user is located, the first portion represented at a first level of detail; a second portion of the scene represented at a second level of detail lower than the first level of detail; and a third portion of the scene represented at a third level of detail lower than the second level of detail.

8. The method of any of the preceding examples, wherein the first foveated image stream uses superpixels to represent a portion of a scene in which the first user is located.

9. The method of any of the preceding examples, wherein: the first user is included in a first plurality of users located at a first scene; the second user is included in a second plurality of users located at a second scene; the first attention stream is a first composite attention stream indicating where attention of each of the first plurality of users is directed with respect to the second scene; and the second attention stream is a second composite attention stream indicating where attention of each of the second plurality of users is directed with respect to the first scene.

10. The method of any of the preceding examples, performed by the first 3D communication device as part of a 3D teleconferencing application in which the first user engages in a 3D teleconferencing session with the second user by way of the first 3D communication device and the second 3D communication device.

11. A three-dimensional (3D) communication device comprising: a display screen configured to present a 3D representation of a scene; a communication interface; and a processor communicatively coupled to the display screen and the communication interface, the processor configured to perform a process comprising: communicating, by way of the communication interface, with an additional 3D communication device to: transmit a first attention stream indicating where attention of a first user of the 3D communication device is directed, receive a second attention stream indicating where attention of a second user of the additional 3D communication device is directed, transmit, based on the second attention stream, a first foveated image stream including a 3D representation of the first user, and receive a second foveated image stream that is transmitted based on the first attention stream and includes a 3D representation of the second user; and presenting the second foveated image stream on the display screen.

12. The 3D communication device of any of the preceding examples, further comprising an array of speakers configured to present 3D audio, and wherein the process further comprises: communicating with the additional 3D communication device to: transmit, to the additional 3D communication device and based on the second attention stream, a first foveated audio stream including a first 3D audio representation for a first scene in which the first user is located, and receive, from the additional 3D communication device, a second foveated audio stream that is transmitted based on the first attention stream and includes a second 3D audio representation for a second scene in which the second user is located; and presenting, using the array of speakers, the second foveated audio stream in synchronization with the presenting the second foveated image stream on the display screen.

13. The 3D communication device of any of the preceding examples, wherein the display screen is implemented as a light field display.

14. The 3D communication device of any of the preceding examples, wherein the first attention stream and the second attention stream are represented using a differential format that indicates how user attention is different at a present point in time as compared to a previous point in time.

15. The 3D communication device of any of the preceding examples, wherein the second foveated image stream includes data representing: a first portion of a scene in which the second user is located, the first portion represented at a first level of detail; a second portion of the scene represented at a second level of detail lower than the first level of detail; and a third portion of the scene represented at a third level of detail lower than the second level of detail.

16. The 3D communication device of any of the preceding examples, wherein the first foveated image stream uses superpixels to represent a portion of a scene in which the first user is located.

17. The 3D communication device of any of the preceding examples, wherein: the first user is included in a first plurality of users located at a first scene; the second user is included in a second plurality of users located at a second scene; the first attention stream is a first composite attention stream indicating where attention of each of the first plurality of users is directed with respect to the second scene; and the second attention stream is a second composite attention stream indicating where attention of each of the second plurality of users is directed with respect to the first scene.

18. A non-transitory computer-readable medium storing instructions that, when executed, cause a processor of a first three-dimensional (3D) communication device used by a first user to perform a process comprising: transmitting, to a second 3D communication device used by a second user, a first attention stream indicating where attention of the first user is directed; receiving, from the second 3D communication device, a second attention stream indicating where attention of the second user is directed; transmitting, to the second 3D communication device and based on the second attention stream, a first foveated image stream including a 3D representation of the first user; receiving, from the second 3D communication device, a second foveated image stream that is transmitted based on the first attention stream and includes a 3D representation of the second user; and presenting the second foveated image stream for viewing by the first user.

19. The non-transitory computer-readable medium of any of the preceding examples, wherein the process further comprises: transmitting, to the second 3D communication device and based on the second attention stream, a first foveated audio stream including a first 3D audio representation for a first scene in which the first user is located; receiving, from the second 3D communication device, a second foveated audio stream that is transmitted based on the first attention stream and includes a second 3D audio representation for a second scene in which the second user is located; and presenting the second foveated audio stream in synchronization with the second foveated image stream.

20. The non-transitory computer-readable medium of any of the preceding examples, wherein the first attention stream and the second attention stream are represented using a differential format that indicates how user attention is different at a present point in time as compared to a previous point in time.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A number of implementations have been described. Nevertheless, it will be understood that various modifications may be made without departing from the spirit and scope of the description and claims. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Specific structural and functional details disclosed herein are merely representative for purposes of describing example implementations. Example implementations, however, may be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. A first element could be termed a second element, and, similarly, a second element could be termed a first element, without departing from the scope of the implementations of the disclosure. As used herein, the term and/or includes any and all combinations of one or more of the associated listed items.

The terminology used herein is for the purpose of describing particular implementations only and is not intended to be limiting of the implementations. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 130 degrees or at other orientations) and the spatially relative descriptors used herein may be interpreted accordingly.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized, or location information may be obtained (such as to a city, zip code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes, and equivalents may occur to those skilled in the art. It is therefore to be understood that the appended claims are intended to cover such modifications and changes as fall within the scope of the implementations. It will be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described. As such, the scope of the present disclosure is not limited to the particular combinations hereafter claimed, but instead extends to encompass any combination of features or example implementations described herein irrespective of whether or not that particular combination has been specifically enumerated in the accompanying claims at this time.

What is claimed is:

1. A method comprising:

transmitting, from a first 3D communication device used by a first user to a second 3D communication device used by a second user, a first attention stream indicating where attention of the first user is directed;

receiving, from the second 3D communication device, a second attention stream indicating where attention of the second user is directed;

transmitting, to the second 3D communication device and based on the second attention stream, a first foveated image stream including a 3D representation of the first user;

receiving, from the second 3D communication device:

a second foveated image stream that is transmitted based on the first attention stream and includes a 3D representation of the second user, and a second foveated audio stream that is transmitted based on the first attention stream and includes a second 3D audio representation for a second scene in which the second user is located, the second 3D audio representation being indicative of first coordinates of a first sound source within the second scene, second coordinates of a second sound source within the second scene, and a ranking of the first sound source with respect to the second sound source; and presenting the second foveated image stream for viewing by the first user and the second foveated audio stream in synchronization with the second foveated image stream, the presenting of the second foveated audio stream including simplifying a head-related transfer function (HRTF) convolution of at least one of the first sound source or the second sound source based on the first coordinates, the second coordinates, and the ranking.

2. The method of claim 1, further comprising transmitting, to the second 3D communication device and based on the second attention stream, a first foveated audio stream including a first 3D audio representation for a first scene in which the first user is located.

3. The method of claim 2, further comprising generating the first foveated audio stream, the generating the first foveated audio stream including:

identifying a plurality of sound sources within the first scene, the plurality of sound sources including a third sound source and a fourth sound source; and determining, with respect to a coordinate system associated with the first scene, third coordinates for the third sound source and fourth coordinates for the fourth sound source.

4. The method of claim 3, wherein:

the generating the first foveated audio stream further includes ranking, based on the third coordinates and the fourth coordinates, the third sound source with respect to the fourth sound source; and the first 3D audio representation included within the first foveated audio stream includes data indicative of the third coordinates, the fourth coordinates, and the ranking of the third source with respect to the fourth source.

5. The method of claim 1, wherein:

the first attention stream includes:

a first entry indicating a portion of a display screen of the first 3D communication device where the attention of the first user is directed, and a first plurality of additional entries each indicating how the attention of the first user has changed since a previous entry in the first attention stream; and the second attention stream includes:

a second entry indicating a portion of a display screen of the second 3D communication device where the attention of the second user is directed, and a second plurality of additional entries each indicating how the attention of the second user has changed since a previous entry in the second attention stream.

6. The method of claim 1, wherein the second foveated image stream includes data representing:

a first portion of the second scene in which the second user is located, the first portion represented at a first level of detail;

a second portion of the second scene represented at a second level of detail lower than the first level of detail; and a third portion of the second scene represented at a third level of detail lower than the second level of detail.

7. The method of claim 1, wherein the first foveated image stream uses superpixels to represent a portion of a first scene in which the first user is located.

8. The method of claim 1, wherein:

the first user is included in a first plurality of users located at a first scene;

the second user is included in a second plurality of users located at the second scene;

the first attention stream is a first composite attention stream indicating where attention of each of the first plurality of users is directed with respect to the second scene; and the second attention stream is a second composite attention stream indicating where attention of each of the second plurality of users is directed with respect to the first scene.

9. The method of claim 1, performed by the first 3D communication device as part of a 3D teleconferencing application in which the first user engages in a 3D teleconferencing session with the second user by way of the first 3D communication device and the second 3D communication device.

10. A three-dimensional (3D) communication device comprising:

a display screen configured to present a 3D representation of a first scene;

a communication interface;

an array of speakers configured to present 3D audio; and a processor communicatively coupled to the display screen and the communication interface, the processor configured to perform a process comprising:

communicating, by way of the communication interface, with an additional 3D communication device to:

transmit a first attention stream that indicates where attention of a first user of the 3D communication device is directed, receive a second attention stream indicating where attention of a second user of the additional 3D communication device is directed, transmit, based on the second attention stream, a first foveated image stream including a 3D representation of the first user, receive a second foveated image stream that is transmitted based on the first attention stream and includes a 3D representation of the second user, and receive a second foveated audio stream that is transmitted based on the first attention stream and includes a second 3D audio representation for a second scene in which the second user is located, the second 3D audio representation being indicative of first coordinates of a first sound source within the second scene, second coordinates of a second sound source within the second scene, and a ranking of the first sound source with respect to the second sound source; and presenting the second foveated image stream on the display screen and presenting the second foveated audio stream on the array of speakers in synchronization with the second foveated image stream, the presenting of the second foveated audio stream including simplifying a head-related transfer function (HRTF) convolution of at least one of the first sound source or the second sound source based on the first coordinates, the second coordinates, and the ranking.

11. The 3D communication device of claim 10, wherein the process further comprises communicating with the additional 3D communication device to transmit, to the additional 3D communication device and based on the second attention stream, a first foveated audio stream including a first 3D audio representation for the first scene in which the first user is located.

12. The 3D communication device of claim 10, wherein the display screen is implemented as a light field display.

13. The 3D communication device of claim 10, wherein: the first attention stream includes:

a first entry indicating a portion of a display screen of the 3D communication device where the attention of the first user is directed, and a first plurality of additional entries each indicating how the attention of the first user has changed since a previous entry in the first attention stream; and the second attention stream includes:

a second entry indicating a portion of an additional display screen of a second 3D communication device where the attention of the second user is directed, and a second plurality of additional entries each indicating how the attention of the second user has changed since a previous entry in the second attention stream.

14. The 3D communication device of claim 10, wherein the second foveated image stream includes data representing:

a first portion of the second scene in which the second user is located, the first portion represented at a first level of detail;

a second portion of the second scene represented at a second level of detail lower than the first level of detail; and a third portion of the second scene represented at a third level of detail lower than the second level of detail.

15. The 3D communication device of claim 10, wherein the first foveated image stream uses superpixels to represent a portion of the first scene in which the first user is located.

16. The 3D communication device of claim 10, wherein: the first user is included in a first plurality of users located at the first scene;

the second user is included in a second plurality of users located at the second scene;

the first attention stream is a first composite attention stream indicating where attention of each of the first plurality of users is directed with respect to the second scene; and the second attention stream is a second composite attention stream indicating where attention of each of the second plurality of users is directed with respect to the first scene.

17. The 3D communication device of claim 10, wherein the process is performed by the 3D communication device as part of a 3D teleconferencing application in which the first user engages in a 3D teleconferencing session with the second user by way of the 3D communication device and a second 3D communication device.

18. A non-transitory computer-readable medium storing instructions that, when executed, cause a processor of a first three-dimensional (3D) communication device used by a first user to perform a process comprising:

transmitting, to a second 3D communication device used by a second user, a first attention stream indicating where attention of the first user is directed;

receiving, from the second 3D communication device, a second attention stream indicating where attention of the second user is directed;

transmitting, to the second 3D communication device and based on the second attention stream, a first foveated image stream including a 3D representation of the first user;

receiving, from the second 3D communication device:

a second foveated image stream that is transmitted based on the first attention stream and includes a 3D representation of the second user, and a second foveated audio stream that is transmitted based on the first attention stream and includes a second 3D audio representation for a second scene in which the second user is located, the second 3D audio representation being indicative of first coordinates of a first sound source within the second scene, second coordinates of a second sound source within the second scene, and a ranking of the first sound source with respect to the second sound source; and presenting the second foveated image stream for viewing by the first user and the second foveated audio stream in synchronization with the second foveated image stream, the presenting of the second foveated audio stream including simplifying a head-related transfer function (HRTF) convolution of at least one of the first sound source or the second sound source based on the first coordinates, the second coordinates, and the ranking.

19. The non-transitory computer-readable medium of claim 18, wherein the process further comprises transmitting, to the second 3D communication device and based on the second attention stream, a first foveated audio stream including a first 3D audio representation for a first scene in which the first user is located.

20. The non-transitory computer-readable medium of claim 18, wherein:

the first attention stream includes:

a first entry indicating a portion of a display screen of the first 3D communication device where the attention of the first user is directed, and a first plurality of additional entries each indicating how the attention of the first user has changed since a previous entry in the first attention stream; and the second attention stream includes:

a second entry indicating a portion of a display screen of the second 3D communication device where the attention of the second user is directed, and a second plurality of additional entries each indicating how the attention of the second user has changed since a previous entry in the second attention stream.

* * * * *